United States Patent [19]

Dixon

[11] Patent Number: 5,722,493
[45] Date of Patent: Mar. 3, 1998

[54] TRACTOR-MOUNTED CULTIVATOR APPARATUS

[76] Inventor: Joseph S. Dixon, PO Box 155, Brant, Alberta, Canada, T0L 0L0

[21] Appl. No.: 724,328

[22] Filed: Oct. 1, 1996

[51] Int. Cl.⁶ ................................................. A01B 13/00
[52] U.S. Cl. ..................................... 172/698; 172/439
[58] Field of Search ........................... 111/101, 102, 111/107; 172/439, 698, 699, 700, 724, 271

[56] References Cited

U.S. PATENT DOCUMENTS

| | | | |
|---|---|---|---|
| 3,022,836 | 2/1962 | Bechman | 172/698 |
| 3,101,794 | 8/1963 | Bechman | 172/698 |
| 3,503,455 | 3/1970 | Oerman | 172/271 |
| 4,010,805 | 3/1977 | Kelly | 172/698 |
| 4,141,301 | 2/1979 | Coldren | 172/724 X |
| 4,210,211 | 7/1980 | Chandler et al. | 172/698 X |
| 4,356,644 | 11/1982 | Harkness | 172/698 X |
| 4,895,211 | 1/1990 | Harris | 172/439 X |

*Primary Examiner*—Terry Lee Melius
*Assistant Examiner*—Robert Pezzuto

[57] ABSTRACT

A cultivator apparatus, for use on a motor vehicle, includes a blade-support/vehicle-connector assembly which includes a horizontally oriented base portion, blade connectors attached to the base portion for connecting to a blade assembly, and first vehicle connectors attached to the base portion for connecting to the motor vehicle. A blade assembly is connected to the blade connectors and extends downward from the base portion. The blade assembly includes a pair of downwardly descending strut members connected to the blade connectors and includes a horizontally extending scraper blade unit connected to the strut members. The blade-support/vehicle-connector assembly further includes a lift-link assembly supported by the base portion. The lift-link assembly includes housing walls connected to the base portion. A lower link-support pin is connected horizontally between the housing walls. An upper link-support pin is connected horizontally between the housing walls. A link member is supported between the housing walls by the lower link-support pin and the upper link-support pin. The link member includes second vehicle connectors. The upper link-support pin is a shear pin. The first vehicle connectors of the base portion include a first three-point-hitch-assembly connector located on a first side of the base portion and include a second three-point-hitch-assembly connector located on a second side of the base portion. The second vehicle connectors of the first link member provide a third three-point-hitch-assembly connector.

6 Claims, 3 Drawing Sheets

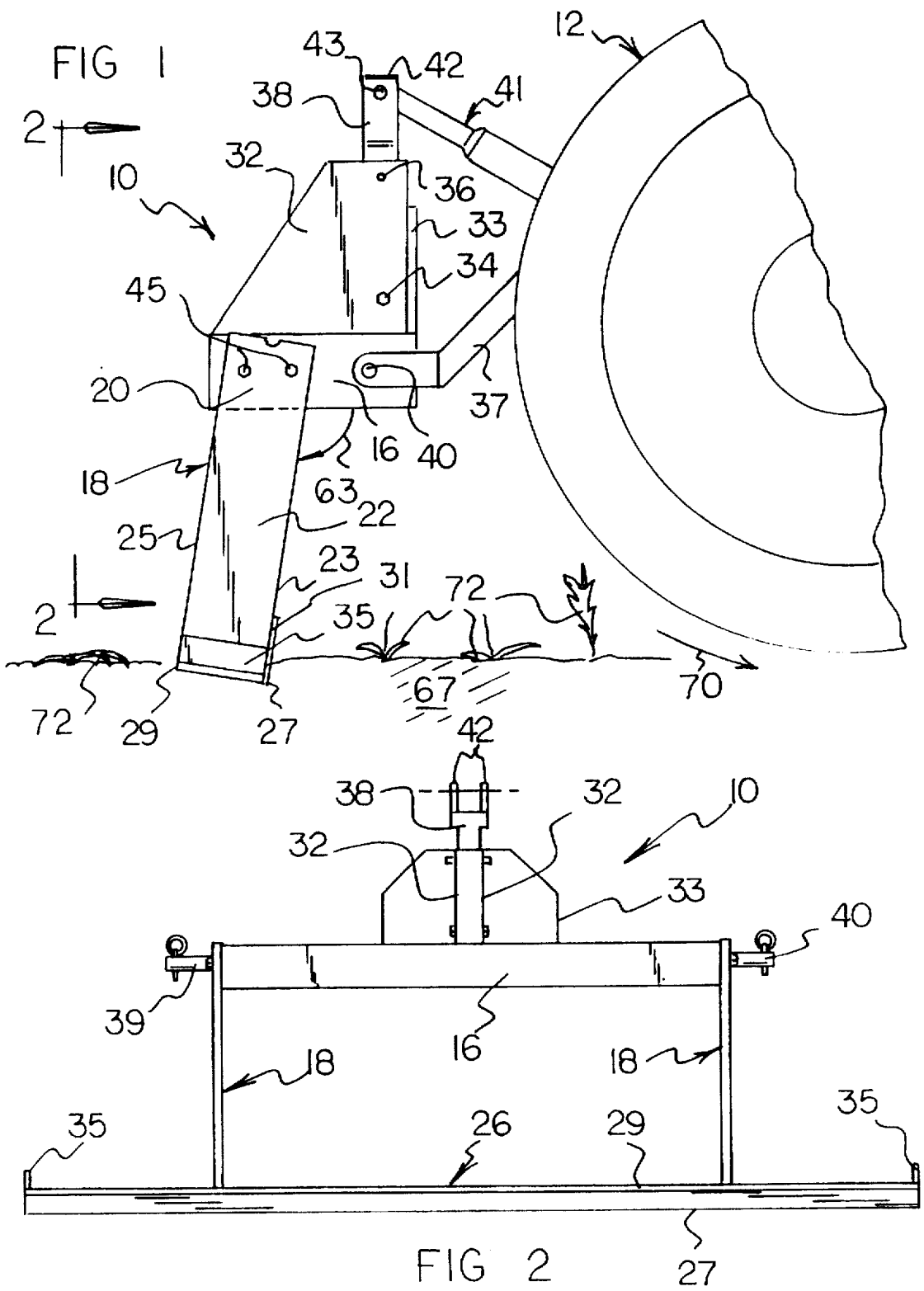

5,722,493

TRACTOR-MOUNTED CULTIVATOR APPARATUS

BACKGROUND OF THE INVENTION

1. Field of the Invention

The present invention relates generally to soil treating attachments for tractors and, more particularly, to a tractor-mounted soil-treating apparatus that is designed to fit a standard three point hitch assembly on a tractor.

2. Description of the Prior Art

Tractor-mounted cultivator devices are well known in the art. Most commonly, a tractor-mounted cultivator device has a plurality of discs which rotate as the tractor rides along the ground. A disadvantage associated with cultivators that employ rotating discs is that bearings around which rotation occurs need periodic lubrication. Moreover, a long array of cultivator discs requires an extensive amount of manufacturing time and effort. As a result, the costs of disc-based cultivators is relatively high. In view of the above, it would be desirable if a tractor-mounted cultivator device were provided which does not employ an array of rotatable discs.

When rotatable cultivator discs are employed, furrows are made in the ground. There are times, however, when it may be desirable to scrape the surface of the ground, rather than to make furrows in the ground. For example, it may be desirable to scrape the surface of the ground when it is desired to cut weeds at ground level or at a level a small depth into the ground. In this respect, it would be desirable if a tractor-mounted cultivator device were provided which provides a blade for scraping the surface of the ground.

A three-point hitch assembly is common on many tractors. For purposes of convenience and ease of use, it would be desirable if a tractor-mounted cultivator device were provided which readily fits onto a conventional three-point hitch assembly.

Still other features would be desirable in a tractor-mounted cultivator apparatus. For example, if a scraper blade is used on the ground surface, it would be desirable if the scraper blade were tilted at an angle with respect to the ground surface so that the scraper blade scrapes and lifts soil slightly off of the ground before the soil returns to the ground. In this way, the soil can be aerated.

When the ground is cultivated, there is often a risk that stones and rocks in the ground can do damage to the cultivator. In this respect, it would be desirable if a tractor-mounted cultivator device were provided which yields to large rocks or stones if such are encountered during cultivation.

A horizontally oriented scraper blade must be supported by vertically oriented supports, that are ultimately supported by the three-point hitch assembly of the tractor. It would be desirable if the vertically oriented supports for the horizontally oriented scraper blade were also in the form of blades so that the vertically oriented supports cut through soil when the horizontally oriented scraper blade is employed.

Thus, while the foregoing body of prior art indicates it to be well known to use tractor-mounted cultivator devices, prior art devices do not provide a tractor-mounted cultivator apparatus which has the following combination of desirable features: (1) does not employ an array of rotatable discs; (2) provides a planar blade for scraping the surface of the ground; (3) readily fits onto a conventional three-point hitch assembly of a tractor; (4) has a scraper blade that is tilted at an angle with respect to the ground surface so that the scraper blade scrapes and lifts soil slightly off of the ground before the soil returns to the ground; (5) yields to large rocks or stones if such are encountered during cultivation; and (6) has vertically oriented supports for a horizontally oriented scraper blade which are in the form of blades so that the vertically oriented supports cut through soil when the horizontally oriented scaper blade is employed. The foregoing desired characteristics are provided by the unique tractor-mounted cultivator apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a cultivator apparatus, for use on a motor vehicle, which includes a blade-support/vehicle-connector assembly which includes a horizontally oriented base portion, blade connectors attached to the base portion for connecting to a blade assembly, and first vehicle connectors attached to the base portion for connecting to the motor vehicle. A blade assembly is connected to the blade connectors and extends downward from the base portion. The blade assembly includes a pair of downwardly descending strut members connected to the blade connectors and includes a transversely extending scraper blade unit connected to the strut members. The scraper blade unit includes a leading scraper-blade edge and a trailing scraper-blade edge. Wing members are connected to distal ends of the scraper blade unit. The wing members extend vertically upward from the scraper blade unit.

Each of the downwardly descending strut members includes an upper strut end, a middle strut portion, and a lower strut end. For each of the strut members, the upper strut end is connected to the blade connectors. The middle strut portion includes a leading edge and a trailing edge. A lower portion of the leading edge is in a form of a cutting blade, and the lower strut end is connected to the scraper blade unit. The scraper blade unit extends substantially horizontally between the strut members.

The blade-support/vehicle-connector assembly further includes a lift-link assembly supported by the base portion. The lift-link assembly includes housing walls connected to the base portion. A lower link-support pin is connected horizontally between the housing walls. An upper link-support pin is connected horizontally between the housing walls. A link member is supported between the housing walls by the lower link-support pin and the upper link-support pin. The link member includes second vehicle connectors. The upper link-support pin is a shear pin.

A reinforcement plate is connected to the housing walls and to the base portion for strengthening the connection between the housing walls and the base portion.

The first vehicle connectors of the base portion include a first three-point-high-assembly connector located on a first side of the base portion and include a second three-point-hitch-assembly connector located on a second side of the base portion The second vehicle connectors of the first link member include a third three-point-hitch-assembly connector.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tractor-mounted cultivator apparatus which has all of the advantages of the prior art and none of the disadvantages.

It is another object of the present invention to provide a new and improved tractor-mounted cultivator apparatus which may be easily and efficiently manufactured and marketed.

It is a further object of the present invention to provide a new and improved tractor-mounted cultivator apparatus which is of durable and reliable construction.

An even further object of the present invention is to provide a new and improved tractor-mounted cultivator apparatus which is susceptible of a low cost of manufacture with regard to both materials and labor, and which accordingly is then susceptible of low prices of sale to the consuming public, thereby making such tractor-mounted cultivator apparatus available to the buying public.

Still yet a further object of the present invention is to provide a new and improved tractor-mounted cultivator apparatus which does not employ an array of rotatable discs.

Still another object of the present invention is to provide a new and improved tractor-mounted cultivator apparatus that provides a planar blade for scraping the surface of the ground.

Yet another object of the present invention is to provide a new and improved tractor-mounted cultivator apparatus which readily fits onto a conventional three-point hitch assembly of a tractor.

Even another object of the present invention is to provide a new and improved tractor-mounted cultivator apparatus that has a scraper blade that is tilted at an angle with respect to the ground surface so that the scraper blade scrapes and lifts soil slightly off of the ground before the soil returns to the ground.

Still a further object of the present invention is to provide a new and improved tractor-mounted cultivator apparatus which yields to large rocks or stones if such are encountered during cultivation.

Yet another object of the present invention is to provide a new and improved tractor-mounted cultivator apparatus that has vertically oriented supports for a horizontally oriented scraper blade which are in the form of blades so that the vertically oriented supports cut through soil when the horizontally oriented scaper blade is employed.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a side view showing a preferred embodiment of the tractor-mounted cultivator apparatus of the invention being employed to scrape a ground surface to cultivate the soil and cut weeds.

FIG. 2 is a front view of the embodiment of the tractor-mounted cultivator apparatus shown in FIG. 1 taken along line 2—2 of FIG. 1.

DESCRIPTION OF THE PREFERRED EMBODIMENT

Figure 3:
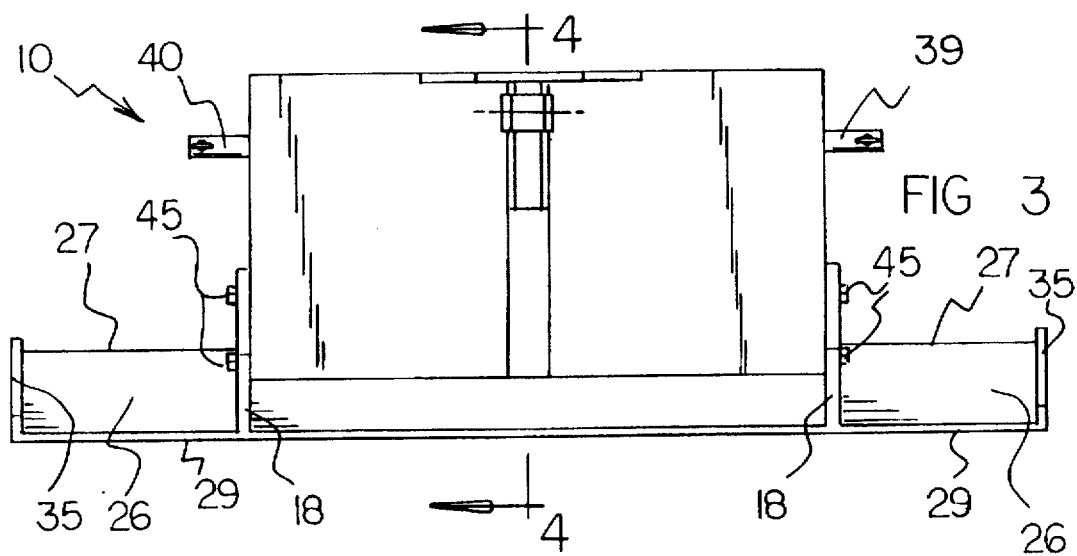
FIG. 3 is a top view of the embodiment of the tractor-mounted cultivator apparatus shown in FIG. 2.
Figure 4:
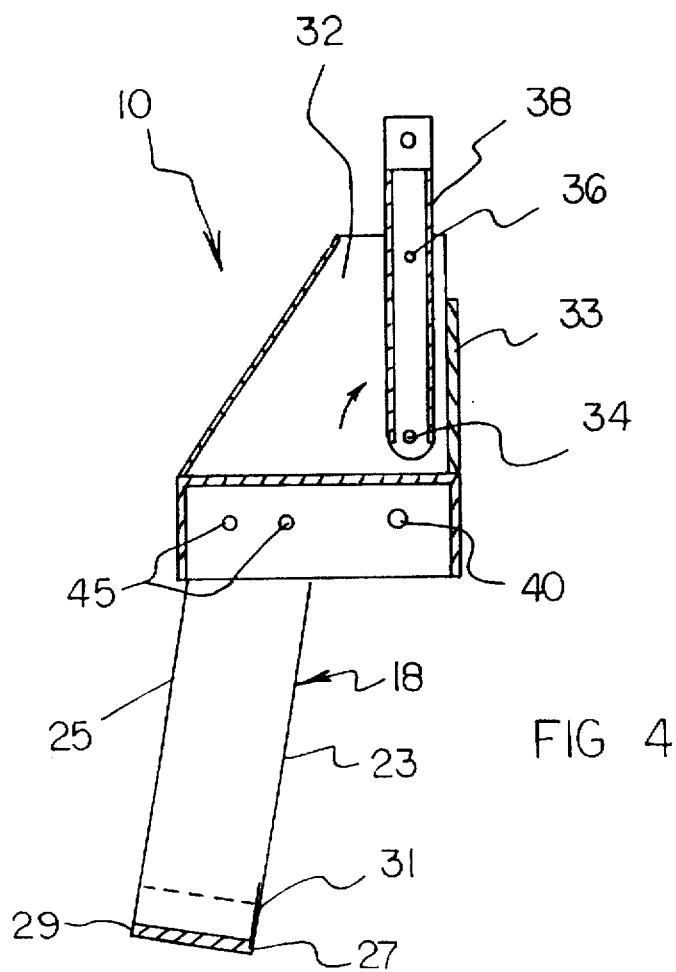
FIG. 4 is an enlarged cross-sectional view of the embodiment of the invention shown in FIG. 3 taken along line 4—4 thereof.

With reference to the drawings, a new and improved tractor-mounted cultivator apparatus embodying the principles and concepts of the present invention will be described.

Turning to FIGS. 1–5, there is shown an exemplary embodiment of the tractor-mounted cultivator apparatus of the invention generally designated by reference numeral 10. In its preferred form, tractor-mounted cultivator apparatus 10 includes a blade-support/vehicle-connector assembly which includes a horizontally oriented base portion 16, blade connectors, attached to the base portion 16, for connecting to a blade assembly, and first vehicle connectors, attached to the base portion 16, for connecting to the motor vehicle 12. A blade assembly is connected to the blade connectors and extend downward from the base portion 16. The blade assembly includes a pair of downwardly descending strut members 18 connected to the blade connectors and includes a transversely extending scraper blade unit 26 connected to the strut members 18. The scraper blade unit 26 includes a leading scraper-blade edge 27 and a trailing scraper-blade edge 29. Wing members 35 are connected to distal ends of the scraper blade unit 26. The wing members 35 extend vertically upward from the scraper blade unit 26.

As shown in FIGS. 2 and 3, the scraper blade unit 26 comprises an elongated, rigid, flat bar (not separately labeled) extending between the blade connectors. The flat bar is substantially straight along an entire longitudinal length thereof so as to reside completely within a single plane to engage a flat ground surface at a uniform depth along substantially all of the flat bar. As shown in FIG. 3, outer lateral ends of the flat bar extend laterally beyond the blade connectors. To prevent penetration into the ground below the scraper blade unit 26, the blade connectors terminate at the flat bar of the scraper blade unit such that no additional structure extends below the flat bar.

Each of the downwardly descending strut members 18 includes an upper strut end 20, a middle strut portion 22, and a lower strut end 24. For each of the strut members 18, the upper strut end 20 is connected to the blade connectors. The middle strut portion 22 includes a leading edge 23 and a trailing edge 25. A lower portion of the leading edge 23 is in a form of a cutting blade 31, and the lower strut end 24 is connected to the scraper blade unit 26. The scraper blade unit 26 extends substantially horizontally between the strut members 18.

The blade-support/vehicle-connector assembly further includes a lift-link assembly supported by the base portion 16. The lift-link assembly includes housing walls 32 connected to the base portion 16. A lower link-support pin 34 is connected horizontally between the housing walls 32. An upper link-support pin 36 is connected horizontally between the housing walls 32. A link member 38 is supported between the housing walls 32 by the lower link-support pin 34 and the upper link-support pin 36. The link member 38 includes second vehicle connectors. The upper link-support pin 36 is a shear pin.

A reinforcement plate 33 is connected to the housing walls 32 and to the base portion 16 for strengthening the connection between the housing walls 32 and the base portion 16. Preferably, the scraper blade unit 26 is welded to the strut members 18, and the reinforcement plate 33 is welded to the housing walls 32 and the base portion 16.

The first vehicle connectors of the base portion 16 include a first three-point-hitch-assembly connector 39 located on a first side of the base portion 16 and include a second three-point-hitch-assembly connector 40 located on a second side of the base portion 16 The second vehicle connectors of the first link member 38 include a third three-point-hitch-assembly connector 42. Preferably, the motor vehicle 12 is a tractor that has a conventional three-point hitch assembly.

The strut members 18 are oriented at a non-perpendicular orientation angle 63 with respect to the base portion 16. The orientation angle 63 is an obtuse angle directed away from the first vehicle connectors.

To attach the strut members 18 to the base portion 16, threaded bolts 45 are placed in registration with apertures 47 in the upper strut ends 20 of the strut members 18. The apertures 47 are placed in registration with threaded apertures 49 on the sides of the base portion 16. Then, the threaded bolts 45 are tightened, whereby the strut members 18 are secured to the base portion 16.

Figure 5:
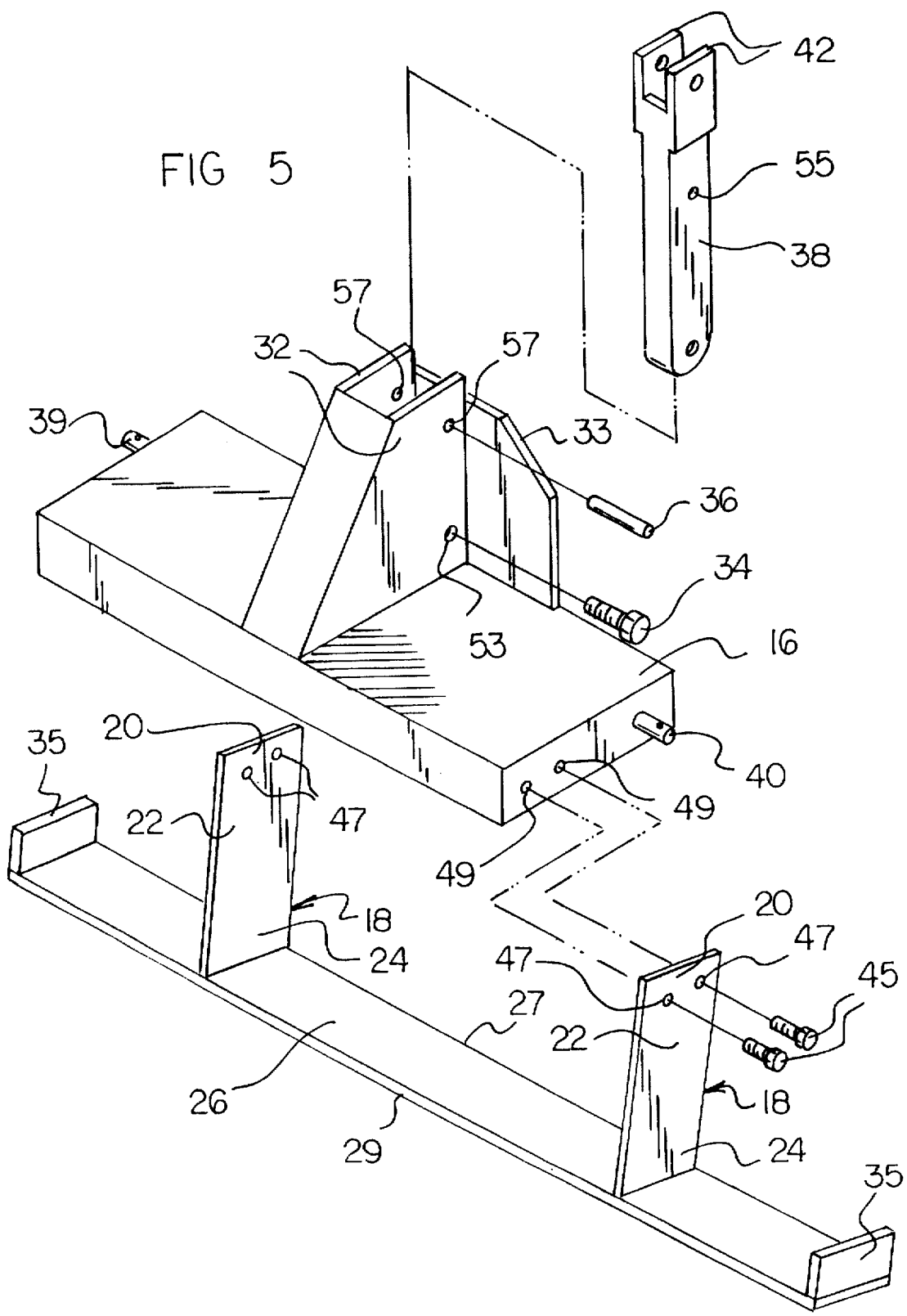
FIG. 5 is an exploded perspective view of the preferred embodiment of the tractor-mounted cultivator apparatus of the invention.

To attach the link member 38 to the housing walls 32, a bottom channel 51 is placed in registration with apertures 53 on the housing walls 32. Then, the lower link-support pin 34 (shown as threaded bolt 34 in FIG. 5, is turned through the apertures 53 and the bottom channel 51. In addition, a top channel 55 is placed in registration with apertures 57 in the housing walls 32. Then, the upper link-support pin 36, shown as shear pin 36 in FIG. 5, is moved through the apertures 57 and the top channel 55. As a result, the link member 38 is secured to the housing walls 32 by the threaded bolt 34 and the shear pin 36.

To use the cultivator apparatus 10 as shown in FIG. 1, the first three-point-hitch-assembly connector 39 is connected to a first tractor strut (not shown), the second three-point-hitch-assembly connector 40 is connected to a second tractor strut 37, and the third three-point-hitch-assembly connector 42 is connected to a free end of a hydraulic piston assembly 41. The free end of the hydraulic piston assembly 41 is connected to the third three-point-hitch-assembly connector 42 using a connector pin 43.

In using the cultivator apparatus 10 of the invention, the person operating the tractor 12 controls the height of the scraper blade unit 26 with respect to the ground 67 by controlling the extension of the hydraulic piston assembly 41. As the hydraulic piston assembly 41 causes the piston assembly to retract, the link member 38 rotates around the connector pin 43 in a clockwise manner. As this occurs, the base portion 16 rotates around the first three-point-hitch-assembly connector 39 and the second three-point-hitch-assembly connector 40 in a clockwise manner. As this occurs, the scraper blade unit 26 rotates around the first three-point-hitch-assembly connector 39 and the second three-point-hitch-assembly connector 40 in a clockwise manner, whereby the scraper blade unit 26 is lifted up from the ground 67.

Contrarily, when the hydraulic piston assembly 41 causes the piston assembly to extend, the link member 38 rotates around the connector pin 43 in a counterclockwise manner. As this occurs, the base portion 16 rotates around the first three-point-hitch-assembly connector 39 and the second three-point-hitch-assembly connector 40 in a counterclockwise manner. As this occurs, the scraper blade unit 26 rotates around the first three-point-hitch-assembly connector 39 and the second three-point-hitch-assembly connector 40 in a counterclockwise manner, whereby the scraper blade unit 26 is lowered onto the ground 67. The greater the degrees of extension of the hydraulic piston assembly 41, the greater degree of ground penetration of the scraper blade unit 26.

When the scraper blade unit 26 has penetrated into the ground 67 as shown in FIG. 1, and as the tractor 12 moves to the right in FIG. 1 in the direction of arrow 70, the leading scraper-blade edge 27 cuts through the ground 67, whereby soil above the leading scraper-blade edge 27 is lifted up, moves over the scraper blade unit 26, and falls off of the scraper blade unit 26 at the trailing scraper-blade edge 29 of the scraper blade unit 26. As the scraper blade unit 26 moves along the ground 67, weeds 72 are cut down by the scraper blade unit 26. Moreover, when the soil that rides up the scraper blade unit 26 falls off of the trailing scraper-blade edge 29, the soil is aerated as it falls back to the ground 67. The wing members 35 also serve to provide additional aeration the soil. Moreover, the wing members 35 help make clearly defined scrape lines on the ground 67 as the scraper blade unit 26 passes through the ground 67. This allows a driver of the tractor 12 to observe clearly defined scraped ground areas to make successive passes on the ground 67 without unnecessarily re-scraping ground areas that have earlier been scraped.

When the ground 67 is scraped, there may be a time when a large stone or rock is struck by the scraper blade unit 26. The stone or rock may be too large for the scraper blade unit 26 to get under and lift. Moreover, the stone or rock may be too large for the scraper blade unit 26 to ride over. If such is the case, the upper link-support pin is present as a shear pin 36, which has a predetermined strength before shearing. When a stone or rock is encountered by the scraper blade unit 26, and when the force of this encounter transmitted up from the stone or rock through the scraper blade unit 26, through the strut members 18, through the threaded bolts 45, through the base portion 16, and through the housing walls 32 to the shear pin 36, if such force received by the shear pin 36 is in excess of the predetermined shear rating for the shear pin 36, then the shear pin 36 will break under the excessive force, and the scraper blade unit 26 will be permitted to rotate clockwise around the first three-point-hitch-assembly connector 39 and the second three-point-hitch-assembly connector 40 so that the scraper blade unit 26 can ride over the rock or stone. A broken shear pin 36 can readily be replaced by aligning the apertures 57 in the housing walls 32 with the top channel 55 of the link member 38, and by inserting a new shear pin 36.

The components of the tractor-mounted cultivator apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved tractor-mounted cultivator apparatus that is low in cost, relatively simple in design and operation, and which may advantageously be used without employing an array of rotatable discs. With the invention, a tractor-mounted cultivator apparatus provides a planar blade for scraping the surface of the ground. With the invention, a tractor-mounted cultivator apparatus is provided which readily fits onto a conventional three-point hitch assembly of a tractor. With the invention, a tractor-mounted cultivator apparatus is provided which has a scraper blade that is tilted at an angle with respect to the ground surface so that the scraper blade scrapes and lifts soil slightly off of the ground before the soil returns to the ground. With the invention, a tractor-mounted cultivator apparatus is provided which yields to large rocks or stones if such are encountered during cultivation. With the invention, a tractor-mounted cultivator apparatus is provided which has vertically oriented supports for a horizontally oriented scraper blade which are in the form of blades so that the vertically oriented supports cut through soil when the horizontally oriented scaper blade is employed.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A cultivator apparatus for use on a vehicle, comprising:

a blade assembly, a base portion for supporting said blade assembly relative to said vehicle, said base portion having and first and second spaced sidewalls and at least one transverse wall extending between said sidewalls, blade connector means for attaching said blade assembly to said base portion, and first and second vehicle connector means, said first and second connector means being attached to said base portion for operatively connecting said blade assembly to said vehicle, wherein said blade connector mean includes a pair of downwardly descending strut members extending from said base portion sidewalls, respectively, wherein said blade assembly comprises a transversely extending scraper blade connected between said pair of strut members and wherein said scraper blade terminates in a pair of opposed distal ends, each of said distal ends extending oppositely and laterally beyond each of said strut members, respectively, each of said distal ends of said scrapper blade terminating in a corresponding wing member oriented orthogonally with respect to said scraper blade, wherein said first vehicle connector means comprises a connecting link member attached to said base portion transverse wall intermedially of said pair of base portion sidewalls, and wherein said second vehicle connector means comprises a pair of connecting link members attached to said base portion sidewalls, respectively.

2. The apparatus of claim 1 wherein said first vehicle connector means further includes a lift-link assembly operatively coupled to said connecting link member supported by said base portion.

3. The apparatus of claim 2 wherein said first vehicle connector means includes housing walls connected to said base portion, a lower link-support pin connected between said housing walls, an upper link-support pin connected between said housing walls, and a lift control member supported between said housing walls by said lower link-support pin and said upper link-support pin, said lift control member being adapted to be connected to said vehicle.

4. The apparatus of claim 3 wherein said upper link-support pin is a shear pin.

5. The apparatus of claim 3 further including:

a reinforcement plate connected to said housing walls and to said base portion for strengthening the connection between said housing walls and said base portion.

6. The apparatus of claim 1 wherein each of said downwardly descending strut members includes an upper strut end, a middle strut portion, and a lower strut end, and wherein, for each of said strut members;

said upper strut end is connected to said blade connector means, said middle strut portion includes a leading edge and a trailing edge, wherein a lower portion of said leading edge is in a form of a cutting blade, and said lower strut end is connected to said scraper blade unit.

* * * * *